United States Patent
Welton et al.

(10) Patent No.: US 7,159,659 B2
(45) Date of Patent: Jan. 9, 2007

(54) VISCOELASTIC SURFACTANT FLUIDS AND ASSOCIATED ACIDIZING METHODS

(75) Inventors: Thomas D. Welton, Duncan, OK (US); Samuel J. Lewis, Duncan, OK (US); Gary P. Funkhouser, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 101 days.

(21) Appl. No.: 11/058,475

(22) Filed: Feb. 15, 2005

(65) Prior Publication Data
US 2006/0180308 A1 Aug. 17, 2006

(51) Int. Cl.
*E21B 43/28* (2006.01)

(52) U.S. Cl. .................. 166/307; 166/282; 507/259

(58) Field of Classification Search .................. None
See application file for complete search history.

(56) References Cited

U.S. PATENT DOCUMENTS

| | | | | |
|---|---|---|---|---|
| 4,061,580 A | 12/1977 | Jahnke | .................. | 252/8.55 R |
| 4,215,001 A | 7/1980 | Elphingstone et al. | . | 252/8.55 C |
| 4,324,669 A | 4/1982 | Norman et al. | ........ | 252/8.55 C |
| 4,495,389 A | 1/1985 | Place | ...................... | 200/83 P |
| 4,591,447 A | 5/1986 | Kubala | .................. | 252/8.55 C |
| 4,737,296 A | 4/1988 | Watkins | .................... | 252/8.553 |
| 5,009,799 A | 4/1991 | Syrinek et al. | ........... | 252/8.553 |
| 5,551,516 A | 9/1996 | Norman et al. | ............. | 166/308 |
| 5,797,456 A * | 8/1998 | Mokadam | .................... | 166/307 |
| 5,964,295 A | 10/1999 | Brown et al. | ................ | 166/308 |
| 6,258,859 B1 | 7/2001 | Dahayanake et al. | ......... | 516/77 |
| 6,399,546 B1 | 6/2002 | Chang et al. | ............... | 507/240 |
| 6,482,866 B1 | 11/2002 | Dahayanake et al. | ......... | 516/77 |
| 6,491,099 B1 | 12/2002 | Di Lullo Arias et al. | ... | 166/300 |
| 6,667,280 B1 | 12/2003 | Chang et al. | ................ | 507/240 |
| 6,703,352 B1 | 3/2004 | Dahayanake et al. | ....... | 507/241 |
| 6,929,070 B1 * | 8/2005 | Fu et al. | .................. | 166/308.2 |
| 2002/0002205 A1 | 1/2002 | Dahayanake et al. | ......... | 516/77 |
| 2003/0019627 A1 | 1/2003 | Qu et al. | ..................... | 166/281 |
| 2003/0054962 A1 | 3/2003 | England et al. | ............. | 507/117 |
| 2003/0139298 A1 | 7/2003 | Fu et al. | ..................... | 507/200 |
| 2003/0166461 A1 | 9/2003 | Angeletakis et al. | ........ | 502/159 |
| 2003/0236179 A1 | 12/2003 | Bodet et al. | ................ | 510/475 |
| 2004/0009880 A1 | 1/2004 | Fu | .............................. | 507/200 |
| 2004/0023812 A1 | 2/2004 | England et al. | ............. | 507/100 |
| 2004/0045710 A1 | 3/2004 | Fu et al. | ..................... | 166/282 |

FOREIGN PATENT DOCUMENTS

GB  2 389 603 A  8/2002
GB  2 389 604 A  8/2002

* cited by examiner

*Primary Examiner*—Zakiya W. Bates
*Assistant Examiner*—Kerry W. Leonard
(74) *Attorney, Agent, or Firm*—Robert A. Kent; Fletcher, Yoder & Van Someren

(57) ABSTRACT

Provided are treatment fluids that comprise an aqueous base fluid, an acid, and a methyl ester sulfonate surfactant, and associated methods of use. In one embodiment, the present invention provides a method of acidizing a subterranean formation comprising: providing a treatment fluid comprising an aqueous base fluid, an acid, and a methyl ester sulfonate surfactant; introducing the treatment fluid into a well bore that penetrates the subterranean formation; and allowing at least a portion of the treatment fluid to react with at least a portion of the subterranean formation so that at least one void is formed in the subterranean formation. In some instances, the treatment fluids exhibit viscoelastic behavior which may be due, at least in part, to the association of at least a portion of the methyl ester sulfonate surfactant into a plurality of micellar structures.

20 Claims, 3 Drawing Sheets

VISCOELASTIC SURFACTANT FLUIDS AND ASSOCIATED ACIDIZING METHODS

CROSS-REFERENCE TO RELATED APPLICATIONS

The present invention is related to co-pending U.S. application Ser. No. 11/058,660 entitled "Viscoelastic Surfactant Fluids and Associated Methods," filed concurrently herewith, co-pending U.S. application Ser. No. 11/058,612 entitled "Viscoelastic Surfactant Fluids and Associated Diverting Methods," filed concurrently herewith, and co-pending U.S. application Ser. No. 11/058,611 entitled "Viscoelastic Surfactant Fluids and Associated Methods," filed concurrently herewith, the entire disclosures of which are incorporated herein by reference.

BACKGROUND

The present invention relates to methods and compositions for treating subterranean formations. More particularly, the present invention relates to treatment fluids that comprise a methyl ester sulfonate ("MES") surfactant, and associated acidizing methods.

The production of desirable fluids (e.g., oil and gas) from subterranean formations may often be enhanced by stimulating a region of the formation surrounding a well bore. Where the subterranean formation comprises acid-soluble components, such as those present in carbonate and sandstone formations, stimulation is often achieved by contacting the formation with a treatment fluid comprising an acid. These acid stimulation treatments are often referred to as "acidizing" the formation. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface, e.g., "flowing back" the well, leaving a desirable amount of voids (e.g., wormholes) within the formation, which enhance the formation's permeability and may increase the rate at which hydrocarbons subsequently may be produced from the formation. One method of acidizing, known as "fracture acidizing," comprises injecting a treatment fluid comprising an acid into the formation at a pressure sufficient to create or enhance one or more fractures within the subterranean formation. Another method of acidizing, known as "matrix acidizing," comprises injecting the treatment fluid into the formation at a pressure below that which would create or enhance one or more fractures within the subterranean formation.

To enhance acidizing treatments, various additives may be added to the treatment fluid. One such additive is a gelling agent which may, among other things, increase viscosity of the treatment fluid for improved diversion and particulate suspension, increase penetration into the reservoir by decreasing the reactivity of such fluid, reduce fluid loss, and/or reduce pumping requirements by reducing friction in the well bore. In some instances, the acidizing treatment may be self-diverting to further enhance the treatment. Among other things, a self-diverting acid treatment may effectively place the acid in a desired region within the subterranean formation, thereby creating a more optimal interaction of the acid with the acid-soluble components of the formation, which may create a desired network of channels that may penetrate deeper into the formation than a conventional acid stimulation treatment. One such self-diverting treatment fluid includes a crosslinkable gelling agent, a crosslinking agent, and a pH buffer to provide a crosslink within a certain pH range. A crosslinkable gelling agent comprising crosslinkable polyacrylamide-based polymers has been found to be useful in calcium carbonate formations. In such a treatment, as the acid reacts, the pH of the self-diverting treatment fluid increases, which causes the fluid to viscosify so as to form a gel that, inter alia, temporarily plugs the perforations or natural fractures accepting the most fluid flow. When the remaining treatment fluid encounters the gel, it is diverted to other portions of the formation. This process then may be repeated—as the treatment fluid is diverted, the acid creates another conductive void, and the treatment fluid is viscosified, diverts flow, and so forth. Once the treatment is complete, the viscosified treatment fluid may be "broken" by reducing its viscosity to a more readily pumpable level, so that the full productivity of the well can be restored.

Despite the advantages of using gelling agents in acid treatments, such treatments may be problematic. For example, conventional polymeric gelling agents may leave an undesirable residue in the subterranean formation after use. As a result, potentially-costly remedial operations may be required to clean up the surfaces inside the subterranean formation. Foamed treatment fluids and emulsion-based treatment fluids have been employed to minimize residual damage, but increased expense and complexity often result.

To combat these problems associated with polymeric gelling agents, some surfactants have been used as gelling agents. Certain surfactants, when mixed with an aqueous fluid having a certain ionic strength, are capable of forming a viscous fluid that has certain elastic properties, one of which may be shear thinning. Surfactant molecules (or ions) at specific conditions may form micelles (e.g., worm-shaped micelles, rod-shaped micelles, etc.) in an aqueous fluid. Depending on, among other things, the surfactant concentration, and the ionic strength of the fluid, etc., these micelles may impart increased viscosity to the aqueous fluid, such that the fluid exhibits viscoelastic behavior due, at least in part, to the association of the surfactant molecules contained therein.

Accordingly, these treatment fluids exhibiting viscoelastic behavior may be used in a variety of subterranean treatments where a viscosified treatment fluid may be useful. For instance, these surfactants may be used in place of conventional polymeric gelling agents in acidizing treatments. In some instances, as the acid reacts with the formation, the reaction by-products and/or spending of the acid may provide the conditions necessary for viscosification of the treatment fluid so as to form a gel that, inter alia, temporarily plugs the perforations or natural fractures accepting the most fluid flow and diverts the remaining treatment fluid and/or another fluid to other regions of the formation. Because the micelles are sensitive to the pH and hydrocarbons, once viscosified, the viscosity of the treatment fluid may be reduced after introduction into the subterranean formation without the need for conventional gel breakers (e.g., oxidizers). This should allow a substantial portion of the treatment fluid to be produced back from the formation without the need for expensive remedial treatments. However, surfactants used heretofore as gelling agents tend to have undesirable environmental characteristics (e.g., toxicity) and/or may be limited by strict environmental regulations in certain areas of the world.

SUMMARY

The present invention relates to methods and compositions for treating subterranean formations. More particularly, the present invention relates to treatment fluids that comprise a MES surfactant, and associated methods.

In one embodiment, the present invention provides a method of acidizing a subterranean formation comprising: providing a treatment fluid comprising an aqueous base fluid, an acid, and a MES surfactant; introducing the treatment fluid into a well bore that penetrates the subterranean formation; and allowing at least a portion of the treatment fluid to react with at least a portion of the subterranean formation so that at least one void is formed in the subterranean formation.

In another embodiment, the present invention provides a method of acidizing a subterranean formation comprising: providing a treatment fluid comprising an aqueous base fluid, an acid, and a MES surfactant; introducing the treatment fluid into a well bore that penetrates the subterranean formation; allowing a first portion of the treatment fluid to react with at least a first portion of the subterranean formation so that a void is formed in the subterranean formation and the first portion of the treatment fluid forms a gel sufficient to divert flow; and allowing the gel to at least partially divert a second portion of the treatment fluid and/or another fluid into a second portion of the subterranean formation.

In another embodiment, the present invention provides a method of acidizing a subterranean formation comprising: providing a treatment fluid comprising an aqueous base fluid, an acid, and a MES surfactant; introducing the treatment fluid into a well bore that penetrates the subterranean formation at or above a pressure sufficient to create or enhance one or more fractures in at least a portion of the subterranean formation; and allowing at least a portion of the treatment fluid to react with at least a portion of the subterranean formation so that at least one void is formed in the subterranean formation.

The features and advantages of the present invention will be readily apparent to those skilled in the art upon a reading of the description of the preferred embodiments that follows.

DRAWINGS

A more complete understanding of the present disclosure and advantages thereof may be acquired by referring to the following description taken in conjunction with the accompanying drawings, wherein.

Figure 1:
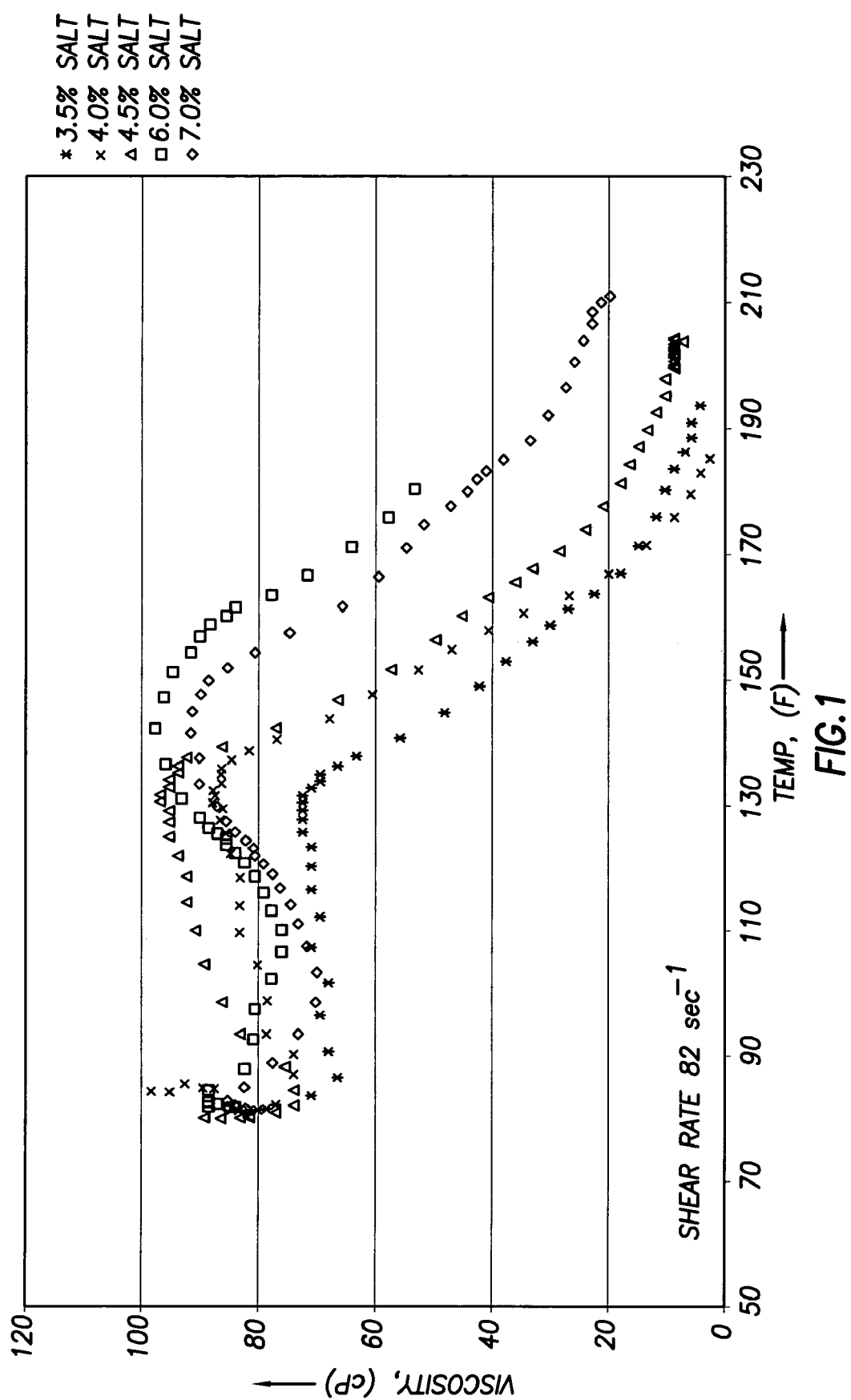
FIG. 1 is a plot of temperature versus viscosity as measured using a nonscanning shear rate procedure on a Fann Model 50 viscometer for sample fluids that comprises a MES surfactant and concentrations of sodium chloride.

While the present invention is susceptible to various modifications and alternative forms, specific exemplary embodiments thereof have been shown by way of example in the drawings and are herein described in detail. It should be understood, however, that the description herein of specific embodiments is not intended to limit or define the invention to the particular forms disclosed, but on the contrary, the intention is to cover all modifications, equivalents, and alternatives falling within the spirit and scope of the invention as defined by the appended claims. The figures should in no way be used to limit the meaning of the claim terms.

DESCRIPTION OF PREFERRED EMBODIMENTS

The present invention relates to methods and compositions for treating subterranean formations. More particularly, the present invention relates to treatment fluids that comprise a MES surfactant, and associated acidizing methods.

The treatment fluids of the present invention generally comprise an MES surfactant, an aqueous base fluid, and an acid. In some instances, the treatment fluids of the present invention may exhibit viscoelastic behavior which may be due, at least in part, to the association of at least a portion of the MES surfactant into a plurality of micellar structures. The MES surfactants suitable for use in the present invention are described by the following formula:

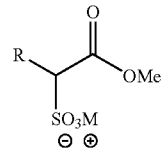

Formula I where R is an alkyl chain of from about 10 carbon atoms to about 30 carbon atoms. In certain embodiments, R is an alkyl chain of from about 16 carbon atoms to about 22 carbon atoms. An example of a suitable MES surfactant of Formula I is a palm-oil derivative commercially available from Halliburton Energy Services, Inc., Duncan, Okla., under the trade name EFS™-4 surfactant. MES surfactants are believed to be relatively environmentally benign, in most instances, because they are biodegradable in most environments. The MES surfactants of Formula I are a class of anionic surfactants that have been found to cause fluids to exhibit viscoelastic properties. It is believed that, when the MES surfactant is dissolved in an aqueous environment having a certain ionic strength, the MES surfactant molecules (or ions) may associate to form micelles because of their hydrophobic and hydrophilic regions. These micelles may function, among other things, to increase the viscosity of the fluid therein. These micelles may be rod-shaped, worm-shaped, or any of a variety of other shapes that will viscosify a fluid where present in sufficient concentrations. In certain embodiments, a sufficiently high concentration of ions to facilitate micelle formation may be maintained, inter alia, by the addition of a water-soluble salt or the interaction of the fluid and/or certain components contained therein with other materials resident in the subterranean formation that generate ions in the presence of the fluid and/or its components. In the presence of a sufficient amount of hydrocarbons or at a certain ionic strength, these micelles may become unstable, thereby disassociating or forming a micellar structure that is not conducive to viscosifying a fluid. This disassociation and/or modification of the micellar structure leads to a reduction in viscosity for the treatment fluid.

The MES surfactants should be present in an embodiment of a treatment fluid of the present invention in an amount sufficient to provide a desired viscosity (e.g., sufficient viscosity to divert flow, reduce fluid loss, etc.) through the formation of the desired micelles. In certain embodiments, the MES surfactants may be present in the treatment fluids of the present invention in an amount of from about 0.5% to about 15% by weight of the fluid ("bwof"). In certain embodiments, the MES surfactants may be present in the treatment fluids of the present invention in an amount of from about 0.5% to about 5% bwof. One of ordinary skill in the art, with the benefit of this disclosure, will be able to determine the appropriate amount of the MES surfactant to include in a treatment fluid of the present invention based on a number of factors, including the desired viscosity, the ionic strength of the fluid, and/or the amount and type of co-surfactant employed.

The aqueous base fluid used in the treatment fluids of the present invention may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability and/or performance of the treatment fluids of the present invention.

The acid of the treatment fluids of the present invention may comprise organic acids, inorganic acids, derivatives thereof, or combinations thereof. An acid with an extremely low pH (e.g., concentrations of HCl greater than about 15%), however, may affect the ability of the treatment fluids of the present invention to form a gel. Examples of suitable acids include, but are not limited to, hydrochloric acid, hydrofluoric acid, formic acid, phosphoric acid, sulfamic acid, acetic acid, derivatives thereof, and mixtures thereof. In certain embodiments, the acid may be present in the treatment fluids in an amount of from about 0.5% to about 20% bwof. In certain embodiments, the acid may be present in the treatment fluids of the present invention in an amount of from about 5% to about 15% bwof. Individuals skilled in the art, with the benefit of this disclosure, will be able to select a suitable acid and a suitable concentration thereof.

To provide the ionic strength for the desired micelle formation, the treatment fluids of the present invention may optionally comprise a water-soluble salt. For example, in some embodiments, it may be desirable to include a water-soluble salt in the treatment fluids of the present invention. Adding a salt may promote micelle formation for the viscosification of the fluid. In another embodiment, the treatment fluids of the present invention may contain no salts so that micelle formation does not occur until a desired time, for example, after the treatment fluid is introduced into the well bore. In some embodiments, the aqueous base fluid may contain the water-soluble salt, for example, where saltwater, a brine, or seawater is used as the aqueous base fluid. Suitable water-soluble salts may comprise ammonium, lithium, sodium, potassium, cesium, magnesium, calcium, or zinc cations, and chloride, bromide, iodide, formate, nitrate, acetate, cyanate, or thiocynate. Examples of suitable water-soluble salts that comprise the above-listed anions and cations include, but are not limited to, ammonium chloride, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, zinc bromide, and combinations thereof. In certain embodiments, the water-soluble salt may be present in the treatment fluids of the present invention in an amount in the range of from about 1% to about 10% bwof. In certain other embodiments, the water-soluble salt may be present in the treatment fluids of the present invention in an amount in the range of from about 5% to about 10% bwof.

The treatment fluids of the present invention may optionally comprise a co-surfactant, among other things, to facilitate the formation of and/or stabilize the foam, increase salt tolerability, and/or stabilize the treatment fluid. The co-surfactant may comprise any surfactant suitable for use in subterranean environments that does not adversely affect the treatment fluid. Examples of suitable co-surfactants include betaines (e.g., cocobetaine, cocoamidopropylbetaine), amine oxides, derivatives thereof, and combinations thereof. One of ordinary skill in the art, with the benefit of this disclosure, will be able to determine which co-surfactants are best suited to the particular embodiments and applications of the compositions and methods described herein. For example, in some embodiments, the treatment fluids of the present invention may be foamed by injection of a gas therein, wherein a co-surfactant (such as a cocobetaine) is included in the treatment fluids of the present invention to facilitate the formation of and/or stabilize the foam. In some embodiments, the co-surfactant may act to at least partially stabilize the treatment fluids. Generally, the co-surfactants may be present in the treatment fluids of the present invention in an amount sufficient to optimize the performance of the treatment fluid in a particular application, as determined by one of ordinary skill in the art. In one embodiment, for example, where the co-surfactant is included to increase salt tolerability or to stabilize the treatment fluid, the co-surfactant is present in a co-surfactant to MES surfactant weight ratio in the range of from about 1:3 to about 3:1.

The treatment fluids of the present invention may further comprise particulates (such as proppant particulates) suitable for use in subterranean applications. Particulates suitable for use in the present invention may comprise any material suitable for use in subterranean operations. Suitable particulate materials include, but are not limited to, sand, bauxite, ceramic materials, glass materials, polymer materials, Teflon® materials, nut shell pieces, cured resinous particulates comprising nut shell, pieces seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may generally range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. In certain embodiments, the particulates included in the treatment fluids of the present invention may be coated with any suitable resin or tackifying agent known to those of ordinary skill in the art that does not adversely affect other components of the treatment fluid.

The treatment fluids of the present invention may further comprise an additive for maintaining and/or adjusting pH (e.g., pH buffers, pH adjusting agents, etc.). For example, the additive for maintaining and/or adjusting pH may be included in the treatment fluids, among other things, to maintain the pH in, or adjust the pH to, a desired range and thereby maintain, or provide, the necessary ionic strength to form the desired micellar structures. The additive for maintaining and/or adjusting pH may also be included in the treatment fluids to prevent precipitation of by-products of the acidizing reaction. Examples of suitable additives for maintaining and/or adjusting pH include, but are not limited to, sodium acetate, acetic acid, sodium or potassium diacetate, sodium or potassium phosphate, sodium or potassium hydrogen phosphate, sodium or potassium dihydrogen phosphate, combinations thereof, derivatives thereof, and the like. The additive for adjusting and/or maintaining pH may be present in the treatment fluids of the present invention in an amount sufficient to maintain and/or adjust the pH of the fluid. One of ordinary skill in the art, with the benefit of this disclosure, will recognize the appropriate additive for maintaining and/or adjusting pH and amount thereof to use for a chosen application.

The treatment fluids of the present invention may optionally comprise additional additives, including, but not limited to, corrosion inhibitors, scale inhibitors, fluid loss control additives, gas, emulsifiers, paraffin inhibitors, asphaltene inhibitors, catalysts, hydrate inhibitors, iron control agents, clay control agents, biocides, friction reducers, combinations thereof and the like. For example, in some embodiments, it may be desired to foam a treatment fluids of the present invention using a gas, such as air, nitrogen, or carbon dioxide. Individuals skilled in the art, with the benefit of this disclosure, will recognize the types of additives that may be necessary for inclusion in the treatment fluids of the present invention for a particular application.

The treatment fluids of the present invention may be prepared by any suitable method. In some embodiments, the treatment fluids may be prepared on the job site. As an example of such an on-site method, a MES surfactant may be combined with an aqueous base fluid and an acid. In one certain embodiment, a salt or an additive for maintaining and/or adjusting pH may be combined with the aqueous base fluid, among other things, to adjust the pH, or maintain the pH, in a desired range to promote the desired micelle formation, such that the treatment fluid exhibits viscoelastic behavior. The additive for maintaining and/or adjusting pH may be combined with the aqueous base fluid either prior to, after, or simultaneously with the MES surfactant. Furthermore, additional additives, as discussed above, may be combined with the treatment fluid and/or the aqueous base fluid as desired. For example, a particulate additive (e.g., a particulate scale inhibitor) or particulates (e.g., gravel particulates or proppant particulates) may be suspended in the treatment fluid. In some embodiments, to facilitate mixing with the aqueous base fluid, the MES surfactant may be combined with a surfactant solubilizer prior to its combination with the other components of the treatment fluid. The surfactant solubilizer may be any suitable surfactant solubilizer, such as water, simple alcohols, glycols, and combinations thereof. For example, in some embodiments, the MES surfactant may be provided in a mixture that comprises the surfactant solubilizer and the MES surfactant. One or ordinary skill in the art, with the benefit of this disclosure, will be able to determine other suitable methods for preparation of the treatment fluids of the present invention.

As previously discussed, at certain conditions, the surfactant molecules present in the treatment fluids may associate to form the desired micelles, which, depending on a number of factors (e.g., MES surfactant concentration), may viscosify the treatment fluid. The micelles present in the treatment fluids of the present invention are generally sensitive to, among other things, the ionic strength of the treatment fluid, hydrocarbons, and shear stress. Further, they also may be sensitive to temperature. Accordingly, these treatment fluids containing the desired micelles may experience a viscosity decline after introduction into the well bore and/or penetration into the subterranean formation, without the need for external gel breakers. As previously discussed, this viscosity reduction is generally due to the dissociation and/or modification of the micellar structure. For example, in hydrocarbon-containing portions of the subterranean formation, the viscosity of the treatment fluids of the present invention may be reduced by contact with the hydrocarbons contained therein. Likewise, in certain portions of the subterranean formation (e.g., carbonate formations), the treatment fluids of the present invention may experience a pH change, thereby facilitating a change in the ionic strength of the fluids. In certain embodiments, dilution of the treatment fluid may also facilitate a reduction in viscosity of the treatment fluid. For example, a treatment fluid of the present invention may be diluted by contact with formation fluids and/or subsequently injected treatment fluids, thereby reducing the concentration of the desired micelles in the treatment fluid and/or changing the ionic strength of the treatment fluid.

In certain embodiments, the treatment fluids of the present invention may be used in acidizing treatments, in which a treatment fluid comprising an aqueous base fluid, an acid, and a MES surfactant may be provided, introduced into a well bore that penetrates a subterranean formation, and allowed to react with at least a portion of the subterranean formation so that at least one void is formed in the subterranean formation. In certain acidizing embodiments, the treatment fluid may be introduced into the well bore at or above a pressure sufficient to create or enhance one or more fractures in at least a portion of the subterranean formation. Optionally, the treatment fluid may comprise other additives suitable for the acidizing treatment. In certain acidizing embodiments, the treatment fluid further may contain a salt, or an additive for maintaining and/or adjusting pH, so that the treatment fluid has the necessary ionic strength to provide a desired viscosity prior to introduction into the subterranean formation. In some embodiments, the treatment fluid may be allowed to viscosify prior to, after, or simultaneously with the step of introducing the treatment fluid into the well bore. As previously discussed, the treatment fluid generally may experience a reduction in viscosity after introduction into the subterranean formation. After a chosen time, the treatment fluid may be recovered through the well bore.

In certain embodiments, a treatment fluid comprising an aqueous base fluid, an acid, and a MES surfactant may be employed as, among other things, a self-diverting acid. Optionally, the treatment fluid may comprise other additives suitable for the acidizing treatment. In some self-diverting embodiments, the treatment fluid may be formulated so that its viscosity is initially very low (e.g., less than about 20 cP at 511 $s^{-1}$). For example, prior to its introduction into the subterranean formation, it may be desired for the treatment fluid to have a viscosity sufficient to provide fluid loss control and/or to reduce friction created by the flow of treatment fluids in the subterranean formation. One of ordinary skill in the art, with the benefit of this disclosure, will recognize the optimal initial viscosity for the treatment fluid in a specific application.

In these self-diverting embodiments, the treatment fluid may be introduced into a well bore that penetrates the subterranean formation and allowed to react with the subterranean formation. As the treatment fluid reacts with the subterranean formation, the presence of reaction by-products and/or spending of the acid may, inter alia, provide the conditions necessary for the viscosification of the treatment fluid into a gel sufficient to divert flow. The viscosity of the gel necessary to divert flow may depend on, among other factors, the depth of the gel plug created, the size of the wormhole to be plugged, the strength of the acid used, the composition of the treatment fluid to be diverted, the temperature of the subterranean formation, and the differential pressure. One of ordinary skill, with the benefit of this disclosure, will recognize the appropriate viscosity sufficient to divert flow for a particular application. The gel may divert subsequently injected fluids to other portions of the subterranean formation. Because the treatment fluid generally will first enter perforations or natural fractures accepting the most fluid (e.g., portions of the subterranean formation with higher permeabilities), other portions of this treatment fluid and/or other fluids (e.g., acidizing treatment fluids) subsequently introduced into the well bore may be diverted to less permeable portions of the subterranean formation. For example, a treatment fluid may be provided and introduced into a well bore that penetrates a subterranean formation, and a first portion of the treatment fluid may be allowed to react with at least a first portion of the subterranean formation so that (1) at least one void is formed in the first portion of the subterranean formation and (2) the first portion of the treatment forms a gel sufficient to divert flow. In such embodiments, the gel may be allowed to at least partially divert a second portion of the treatment fluid and/or another fluid into a second portion of the subterranean formation.

The gelling and diversion optionally may be repeated as additional amounts of the treatment fluid are introduced into the well bore. For example, the second portion of the treatment fluid may be allowed to react with at least the second portion of the subterranean formation so that (1) at least one void is formed in the second portion of the subterranean formation and (2) the second portion of the treatment fluid forms a gel sufficient to divert flow. After a chosen time, the treatment fluid may be recovered through the well bore.

To facilitate a better understanding of the present invention, the following examples of preferred embodiments are given. In no way should the following examples be read to limit or define the entire scope of the invention.

EXAMPLES

Example 1

To determine the viscosification of a treatment fluid using a MES surfactant, laboratory samples were prepared by mixing a MES surfactant (EFS™-4 surfactant) with an aqueous base fluid. The aqueous base fluid used was tap water unless otherwise indicated. In certain samples, a salt was included in the aqueous base fluid. Where included, the concentration and type of salt included in the aqueous base fluid were varied. Once prepared, each sample was observed to determine gel formation. For purposes of this example, a sample was considered gelled if it had a viscosity of greater than about 20 centipoise at 511 sec$^{-1}$. The compositions of each sample and observations thereof are listed in Table 1.

TABLE 1

| Sample No. | MES Concentration[1] (by weight) | Aqueous Base Fluid | Result |
|---|---|---|---|
| 1 | 5% | Water | Not gelled |
| 2 | 5% | Seawater | Gelled |
| 3 | 5% | 5% KCl by wt | Gelled |
| 4 | 5% | 5% NaCl by wt | Gelled |
| 5 | 5% | 10% NaCl by wt | Gelled |
| 6 | 5% | 5% CaCl$_2$ by wt | Gelled |
| 7 | 5% | 10% CaCl$_2$ by wt | Gelled |
| 8 | 5% | 5% NaCl by wt 5% CaCl$_2$ by wt | Gelled |
| 9 | 5% | 10% NaCl by wt 10% CaCl$_2$ by wt | Gelled |
| 10 | 5% | 5% NH$_4$Cl by wt | Gelled |
| 11 | 5% | 10% NH$_4$Cl by wt | Gelled |

[1]Similar results were obtained for each sample when 10% by weight of the MES surfactant was used.

Additionally, further samples were prepared, wherein a sufficient amount of sodium hydroxide was included in the aqueous base fluid so that the pH of the sample was above 7, i.e. the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 2.

TABLE 2

| Sample No. | MES Concentration[2] (by weight) | Aqueous Base Fluid (basified with NaOH to pH 10) | Result |
|---|---|---|---|
| 12 | 5% | 5% NaCl by wt | Gelled |
| 13 | 5% | 10% NaCl by wt 5% KCl by wt | Gelled |
| 14 | 5% | 5% CaCl$_2$ by wt | Gelled |
| 15 | 5% | 10% CaCl$_2$ by wt | Gelled |
| 16 | 5% | 5% NaCl by wt 5% CaCl$_2$ by wt | Gelled |
| 17 | 5% | 10% NaCl by wt 10% CaCl$_2$ by wt | Gelled |
| 18 | 5% | seawater | Gelled |
| 19 | 5% | 5% NH$_4$Cl by wt | Gelled |

[2]Similar results were obtained for each sample when 10% by weight of the MES surfactant was used.

Additionally, further samples were prepared, wherein a sufficient amount of hydrochloric acid was included in the aqueous base fluid so that the pH of the sample was below 7, i.e. the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 3.

TABLE 3

| Sample No. | MES Concentration[3] (by weight) | Aqueous Base Fluid (acidified with HCl to pH 4) | Result |
|---|---|---|---|
| 20 | 5% | 5% NaCl by wt | Gelled |
| 21 | 5% | 10% NaCl by wt | Gelled |

TABLE 3-continued

| Sample No. | MES Concentration[3] (by weight) | Aqueous Base Fluid (acidified with HCl to pH 4) | Result |
|---|---|---|---|
| 22 | 5% | 5% KCl by wt 5% CaCl$_2$ by wt | Gelled |
| 23 | 5% | 10% CaCl$_2$ by wt | Gelled |
| 24 | 5% | 5% NaCl by wt 5% CaCl$_2$ by wt | Gelled |
| 25 | 5% | 10% NaCl by wt 10% CaCl$_2$ by wt | Gelled |
| 26 | 5% | seawater | Gelled |
| 27 | 5% | 5% NH$_4$Cl by wt | Gelled |

[3]Similar results were obtained for each sample when 10% by weight of the MES surfactant was used.

Additionally, further samples were prepared wherein the aqueous base fluid contained 15% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 4.

TABLE 4

| Sample No. | MES Concentration[4] (by weight) | Aqueous Base Fluid | Result |
|---|---|---|---|
| 28 | 5% | 15% HCl | Not gelled |
| 29 | 5% | 15% HCl 5% NaCl by wt | Not gelled |
| 30 | 5% | 15% HCl 5% KCl by wt | Not gelled |
| 31 | 5% | 15% HCl 5% CaCl$_2$ by wt | Not gelled |
| 32 | 5% | 15% HCl 5% NH$_4$Cl by wt | Not gelled |

[4]Similar results were obtained for each sample when 10% by weight of the MES surfactant was used.

Additionally, further samples were prepared wherein the aqueous base fluid contained 10% hydrochloric acid by weight of the aqueous base fluid. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 5.

TABLE 5

| Sample No. | MES Concentration (by weight) | Aqueous Base Fluid | Result |
|---|---|---|---|
| 33 | 5% | 10% HCl | Gelled |
| 34 | 5% | 10% HCl 5% NaCl by wt | Gelled |
| 35 | 5% | 10% HCl 5% KCl by wt | Gelled |
| 36 | 5% | 10% HCl 5% CaCl$_2$ by wt | Gelled |
| 37 | 5% | 10% HCl 5% NH$_4$Cl by wt | Gelled |

Additionally, further samples were prepared, wherein a sufficient amount of sodium hydroxide was included in the aqueous base fluid so that the pH of the sample was above 7, i.e. the sample was basified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 6.

TABLE 6

| Sample No. | MES Concentration (by weight) | Aqueous Base Fluid (basified with NaOH to pH 10) | Result |
|---|---|---|---|
| 38 | 5% | 5% CaCl$_2$ by wt | Gelled |
| 39 | 5% | 5% MgCl$_2$ by wt | Gelled |
| 40 | 5% | 5% CaCl$_2$ by wt 5% MgCl$_2$ by wt | Gelled |

Additionally, further samples were prepared, wherein a sufficient amount of hydrochloric acid was included in the aqueous base fluid so that the pH of the sample was below 7, i.e. the sample was acidified. In certain samples, a salt was included in the aqueous base fluid. Where included, the concentration and type of salt included in the aqueous base fluid were varied. Once prepared, each sample was observed to determine the gel formation. The compositions of each sample and observations thereof are listed in Table 7.

TABLE 7

| Sample No. | MES Concentration (by weight) | Aqueous Base Fluid (acidified with HCl to pH 4) | Result |
|---|---|---|---|
| 41 | 5% | 5% CaCl$_2$ by wt | Gelled |
| 42 | 5% | 5% MgCl$_2$ by wt | Gelled |
| 43 | 5% | 5% CaCl$_2$ by wt 5% MgCl$_2$ by wt | Gelled |

Thus, Example 1 indicates that a MES surfactant may be used to viscosify a fluid.

Example 2

Rheological tests were performed on laboratory samples that were prepared as follows. Samples were prepared by mixing water with the following components: an MES surfactant in an amount of about 1.5% by weight of the sample; a cocobetaine in an amount of about 1.5% by weight of the sample; and various concentrations of sodium chloride (3.5%, 4.0%, 4.5%, 6.0%, and 7.0%). The MES surfactant included in the samples was an alpha-sulfo fatty acid methyl ester that is commercially available as ALPHA-STEP XMP-66® from Stepan Company, Northfield, Ill. Further, the cocobetaine used in the samples is commercially available as Witco Rewoteric AM B-13®.

Once prepared, the samples were each placed in the R1 rotor cup of a Fann Model 50 viscometer to determine the viscosities of the sample, utilizing a nonscanning shear rate procedure. The rotor cups containing the samples were set in motion at a constant rate of about 95 rpm providing a shear rate of about 82 sec$^{-1}$ on the sample. The sample was brought up to about 230° F. as the viscosities of the samples were measured. A plot of temperature (° F.) versus viscosity (cP) for each sample is provided in FIG. 1. Table 8 identifies the maximum viscosities and corresponding temperatures for each sample.

TABLE 8

| NaCl Concentration (by weight) | Max Viscosity (cP) | Temperature (° F.) |
|---|---|---|
| 3.5% | 73 | 133 |
| 4.0% | 88 | 132 |
| 4.5% | 97 | 132 |
| 6.0% | 98 | 142 |
| 7.0% | 92 | 141 |

Thus, Example 2 illustrates that a MES surfactant may be used to viscosify a fluid.

Example 3

Rheological tests were performed on laboratory samples that were prepared as follows. Two samples were prepared by mixing water with the following components: an MES surfactant in an amount of about 5% by weight of the sample with about 5% sodium chloride. Sample A was used without adjusting the pH. The pH of Sample B was adjusted with NaOH to about 10. The MES surfactant included in the samples was an alpha-sulfo fatty acid methyl ester that is commercially available as EFS™-4 Surfactant from Halliburton Energy Services, Inc., Duncan, Okla.

Figure 2:
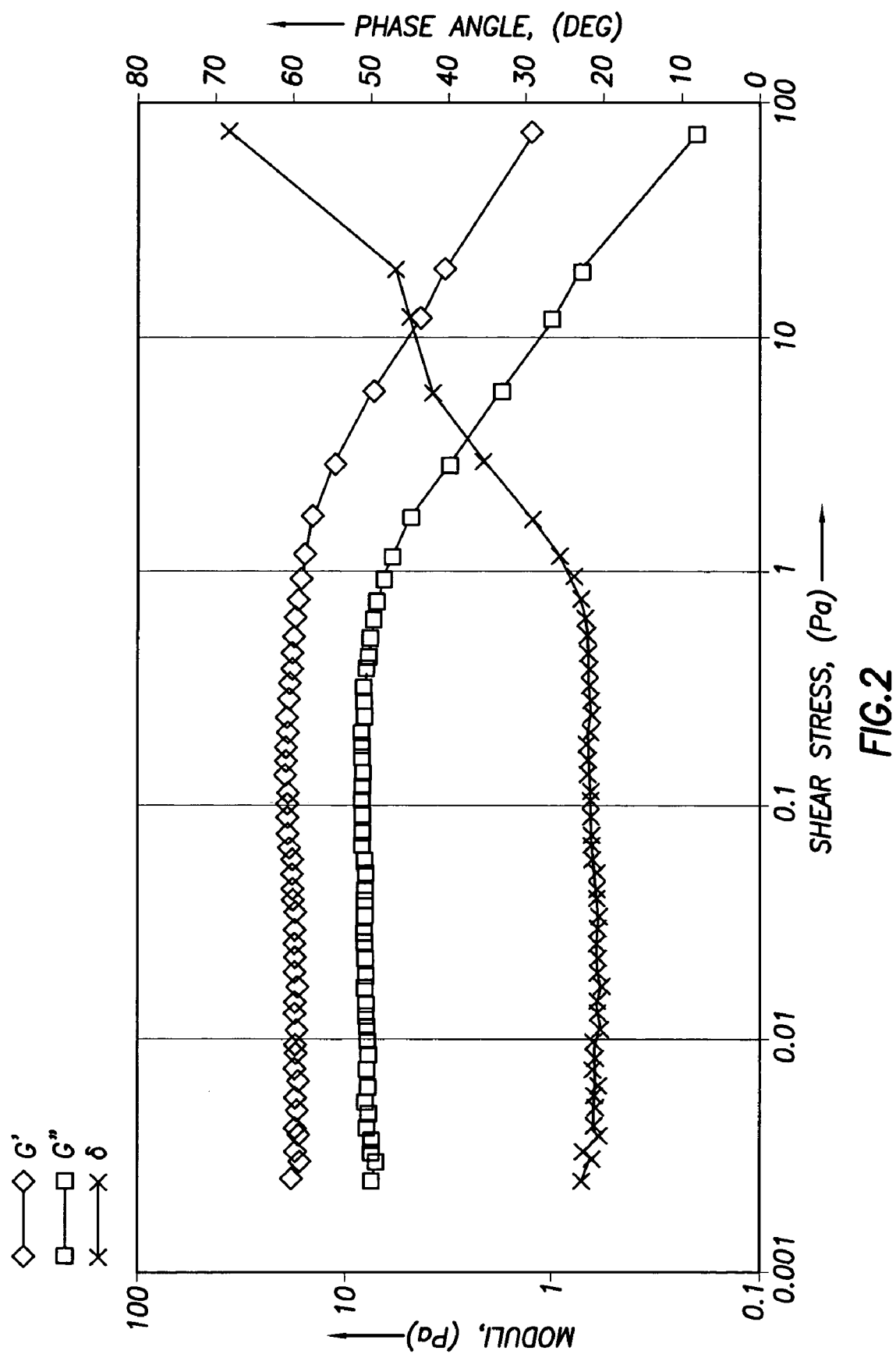
FIG. 2 is a plot of shear stress versus storage modulus, loss modulus, and phase angle as measured using a Haake Rheostress RS150 stress-controlled rheometer for a sample fluid that comprises a MES surfactant and sodium chloride.
Figure 3:
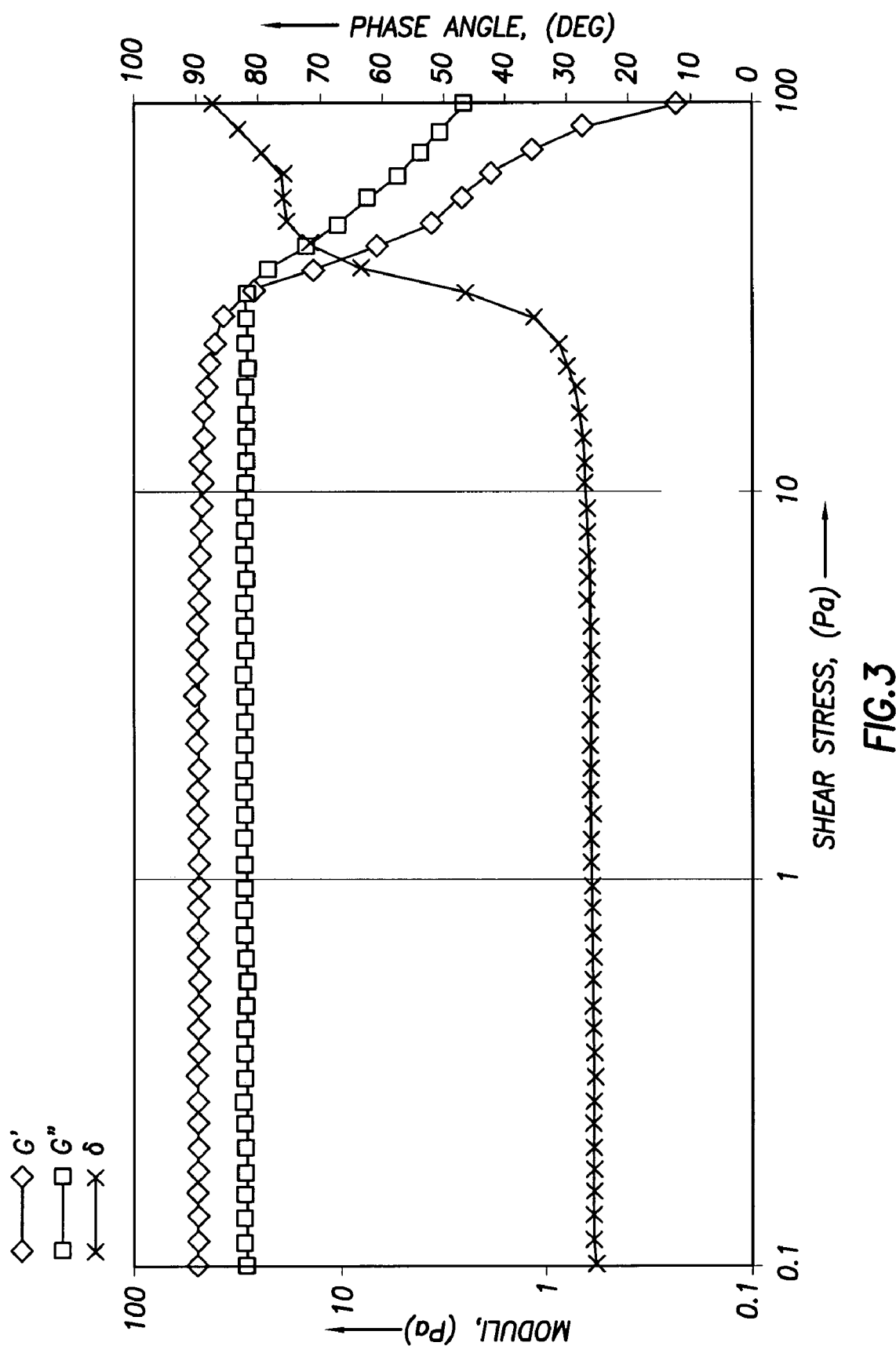
FIG. 3 is a plot of shear stress versus storage modulus, loss modulus, and phase angle as measured using a Haake Rheostress RS150 stress-controlled rheometer for another sample fluid that comprises a MES surfactant and sodium chloride.

Once the samples were prepared, the rheology was determined using a Haake RheoStress RS150 stress-controlled rheometer fitted with a 60 mm diameter, 2° cone and plate. The temperature was held constant at 25° C. A constant frequency (1 Hz) oscillatory stress sweep was performed over the stress range indicated to obtain the storage modulus (G'), loss modulus (G"), and phase angle (δ). Results are shown in FIGS. 2 and 3 for Samples A and B, respectively.

Thus, Example 3 illustrates that a MES surfactant may be used to viscosify a fluid.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims. The terms used in the claims have their plain, ordinary meaning unless otherwise defined by the patentee.

What is claimed is:

1. A method of acidizing a subterranean formation comprising:
    providing a treatment fluid comprising:
        an aqueous base fluid;
        an acid; and
        a methyl ester sulfonate surfactant for increasing the viscosity of the treatment fluid and having the following formula:

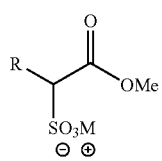

where R is an alkyl chain of from about 10 carbon atoms to about 30 carbon atoms;
    introducing the treatment fluid into a well bore that penetrates the subterranean formation;
    allowing at least a portion of the treatment fluid to react with at least a portion of the subterranean formation so that at least one void is formed in the subterranean formation; and
    allowing the treatment fluid to viscosify due at least to association of at least a portion of the methyl ester sulfonate surfactant into a plurality of micellar structures.

2. The method of claim 1 wherein the treatment fluid exhibits viscoelastic behavior due, at least in part, to the association of the portion of the methyl ester sulfonate surfactant into the plurality of micellar structures.

3. The method of claim 1 wherein allowing the treatment fluid to viscosify occurs prior to, after, or simultaneously with the step of introducing the treatment fluid into the well bore.

4. The method of claim 1 further comprising allowing the treatment fluid to contact the subterranean formation for a period of time sufficient to reduce the viscosity of the treatment fluid.

5. The method of claim 1 further comprising allowing the treatment fluid to contact hydrocarbons contained in the subterranean formation, a formation fluid, and/or another treatment fluid, thereby reducing the viscosity of the treatment fluid.

6. The method of claim 1 wherein the acid comprises at least one of the following: an organic acid; an inorganic acid; or a derivative thereof.

7. The method of claim 1 wherein R is an alkyl chain of from about 16 carbon atoms to about 22 carbon atoms.

8. The method of claim 1 wherein the methyl ester sulfonate surfactant is present in the treatment fluid in an amount of from about 0.5% to about 15% by weight of the treatment fluid.

9. The method of claim 1 wherein the treatment fluid further comprises a water-soluble salt.

10. The method of claim 1 wherein the treatment fluid further comprises at least one of the following: a co-surfactant; particulates; an additive for adjusting and/or maintaining pH; a fluid loss control additive; a gas; a corrosion inhibitor; a scale inhibitor; a catalyst; a clay control agent; a biocide; or a friction reducer.

11. The method of claim 10 wherein the treatment fluid further comprises a co-surfactant in a co-surfactant to methyl ester sulfonate surfactant weight ratio in the range of from about 1:3 to about 3:1.

12. The method of claim 1 wherein the treatment fluid further comprises a co-surfactant comprising at least one of the following: a betaine; an amine oxide; or a derivative thereof.

13. The method of claim 1 wherein the treatment fluid comprises a water-soluble salt for promoting viscosification of the treatment fluid in an amount in the range of from about 1% to about 10% by weight of the treatment fluid.

14. A method of acidizing a subterranean formation comprising:
    providing a treatment fluid comprising:
        an aqueous base fluid;
        an acid; and
        a methyl ester sulfonate surfactant for increasing the viscosity of the treatment fluid and having the following formula:

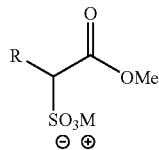

where R is an alkyl chain of from about 10 carbon atoms to about 30 carbon atoms;

introducing the treatment fluid into a well bore that penetrates the subterranean formation;

allowing a first portion of the treatment fluid to react with at least a first portion of the subterranean formation so that a void is formed in the subterranean formation and the first portion of the treatment fluid forms a gel sufficient to divert flow; and allowing the gel to at least partially divert a second portion of the treatment fluid and/or another fluid into a second portion of the subterranean formation.

15. The method of claim 14 wherein the treatment fluid exhibits viscoelastic behavior due, at least in part, to the association of at least a portion of the methyl ester sulfonate surfactant into a plurality of micellar structures.

16. The method of claim 14 wherein the treatment fluid further comprises a water-soluble salt.

17. The method of claim 14 wherein the treatment fluid further comprises at least one of the following: a co-surfactant; particulates; an additive for adjusting and/or maintaining pH; a fluid loss control additive; a gas; a corrosion inhibitor; a scale inhibitor; a catalyst; a clay control agent; a biocide; or a friction reducer.

18. A method of acidizing a subterranean formation comprising:

providing a treatment fluid comprising:
an aqueous base fluid;
an acid; and
a methyl ester sulfonate surfactant for increasing the viscosity of the treatment fluid and having the following formula:

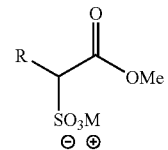

where R is an alkyl chain of from about 10 carbon atoms to about 30 carbon atoms;

introducing the treatment fluid into a well bore that penetrates the subterranean formation at or above a pressure sufficient to create or enhance one or more fractures in at least a portion of the subterranean formation;

allowing at least a portion of the treatment fluid to react with at least a portion of the subterranean formation so that at least one void is formed in the subterranean formation; and allowing the treatment fluid to viscosify due at least to association of at least a portion of the methyl ester sulfonate surfactant into a plurality of micellar structures.

19. The method of claim 18 wherein the treatment fluid exhibits viscoelastic behavior due, at least in part, to the association of the portion of the methyl ester sulfonate surfactant into the plurality of micellar structures.

20. The method of claim 18 wherein the treatment fluid further comprises at least one of the following: a water-soluble salt; a co-surfactant; particulates; an additive for adjusting and/or maintaining pH; a fluid loss control additive; a gas; a corrosion inhibitor; a scale inhibitor; a catalyst; a clay control agent; a biocide; or a friction reducer.

* * * * *